United States Patent [19]

Brezny

[11] 4,169,734
[45] Oct. 2, 1979

[54] CHEMICALLY BONDED MAGNESIA-CHROME REFRACTORIES

[75] Inventor: Bohus Brezny, Middletown, Ohio

[73] Assignee: Armco Steel Corporation, Cincinnati, Ohio

[21] Appl. No.: 879,438

[22] Filed: Feb. 21, 1978

[51] Int. Cl.² .................. C04B 35/04; C04B 35/42
[52] U.S. Cl. .......................................................... 106/59
[58] Field of Search .................................................. 106/59

[56] References Cited

U.S. PATENT DOCUMENTS

| | | | |
|---|---|---|---|
| 2,947,649 | 8/1960 | Davies | 106/59 |
| 3,199,994 | 8/1965 | Davies | 106/59 |
| 3,232,774 | 2/1966 | Kehl | 106/59 |
| 3,522,063 | 7/1970 | Treffner et al. | 106/59 |
| 3,715,223 | 2/1973 | Wright | 106/59 |
| 4,071,370 | 1/1978 | Davies | 106/59 |

*Primary Examiner*—James Poer
*Attorney, Agent, or Firm*—Melville, Strasser, Foster & Hoffman

[57] ABSTRACT

A composition which improves the hot strength of chemically bonded refractory shapes such as brick. The composition is comprised of refractory brickmaking size graded magnesia and chrome ore grain in a weight ratio between 90/10 and 30/70. The major portion of chrome ore grains must be smaller than 28 mesh; preferably, therefore, such chrome ore grains should be of a size that will pass 28 mesh screens and stay on 200 mesh screens. The lime (CaO) silica ($SiO_2$) ratio is in the range of 0.2 to 2.5 depending on the total silica content of the system. Such silica content should never be more than about 2.5% by weight on the basis of an oxide analysis of the whole mix, but it may be as low as about 0.5% on the same basis. When the silica content is low (0.5 to 1.3%), the lime/silica ratio may be either high (1.8 to 2.5) or low (0.2 to 1.0). When, however, the silica content is high (1.4 to 2.5%), the lime/silica ratio must be low (0.2 to 1.0). In some embodiments of the invention metal elements, internal and/or external, such as plates and the like, may be incorporated with the shape, preferably in situ, as the chemically bonded refractory shape is formed.

24 Claims, No Drawings

CHEMICALLY BONDED MAGNESIA-CHROME REFRACTORIES

BACKGROUND OF THE INVENTION

1. Field of the Invention

The chemically bonded chrome-magnesia refractories of this invention have use in the construction of furnaces and vessels for the manufacture of steel, cement, copper and so on.

2. Description of the Prior Art

Although a complete preliminary patentability search has not been conducted, there are patents known to be relevant to chemically bonded brick and, for that matter, to direct bonded brick which might have some bearing on these disclosures. Generally, representative United States patents disclosing chemically bonded brick are Woodhouse et al. U.S. Pat. No. 3,475,188; Davis et al. U.S. Pat. No. 3,479,194; and Farrington et al. U.S. Pat. No. 3,615,776. United States patents disclosing direct bonded brick are Wright U.S. Pat. No. 3,715,223; Farrington et al. U.S. Pat. No. 3,829,541; Davis U.S. Pat. No. 3,852,080; and Farrington et al. U.S. Pat. No. 3,864,136.

The disclosures of the Wright U.S. Pat. No. 3,715,223 are of interest. This patent claims a fired or direct bonded brick. Some of the ingredients and ratios, however, approach those disclosed herein. Wright, for example, discloses a ratio of magnesia to chrome of 80 to 20 and 40 to 60; as to the fineness of the chrome ore, Wright contains one example wherein 69% of such ore passes a 28 mesh screen. The Wright patent also indicates a lime-silica ratio of 1.5 to 2.5; such patent also calls for a silica content of the batch to be 0.3 to 2. Finally, the Wright patent indicates that 10% of the tempering liquid, which is itself 2-4 parts, should be calcium nitrate, and/or that calcium nitrate (calculated as CaO) should be 1.5-2.5 of the total $SiO_2$ content of the batch.

Although the Wright patent claims a fired or direct bonded brick, the Summary of the Invention of that patent indicates that benefits may be detected in the unfired shape and that the method taught could be used to produce "improved" chemically bonded refractory. The Wright patent, however, does not suggest that the firing step of its disclosure should or could be eliminated and the patent does not suggest that the chemically bonded refractory possibly obtainable would be so "improved" that it could be used in place of direct bonded or fired brick.

The instant invention taught in this application resides in a chemically bonded brick capable of being used under severe high temperature application, such as, for example, in the construction of open hearth furnaces for steel making, wherein operating temperatures may be in the range of 2800° F. to 3100° F. (1540° C. to 1705° C.). Such a brick may also incorporate metal elements which will at least be present as such during initial service within an actual furnace so as to reinforce the "green" chemically bonded brick during initial firing of the furnace.

Wright neither teaches or suggests the making and composition of a chemically bonded brick that could be used under such severe high temperature conditions, nor does Wright teach a chemically bonded brick which includes internal metal elements.

SUMMARY OF THE INVENTION

A chemically bonded refractory shape comprised of refractory brick making size graded magnesia and chrome ore grain in a weight ratio between 90/10 and 30/70. The major portion of chrome ore grains must be of a size between −24 and +200 mesh screen. In the preferred embodiment of this invention, all the chrome ore passes 24 mesh screen size. The typical chemistry of Transvaal chrome ore is $SiO_2$ of 1.00%, $Cr_2O_3$ of 45.0%, CaO of up to 0.1%, MgO of 10.0%, $Fe_2O_3$ of 29.0%, and $Al_2O_3$ of 15%. A typical chemistry of the magnesia or periclase may be MgO of 96%, CaO of 3.5%, and $SiO_2$ of about 1%.

The method of making a chemically bonded refractory shape comprises the steps of preparing a batch from 30 to 90 parts of size graded periclase, and 70 to 10 parts of size graded particles of chrome ore, the major portions of the chrome ore grains passing 24 mesh screens and staying on 200 mesh screens; mixing the grains with sufficient amounts of liquid to temper the batch for efficient forming; forming the mixture into shapes; and drying the shape. In some embodiments metal elements are incorporated with the shape when it is formed.

In that embodiment (noting that all of the embodiments of this invention utilize the fine chrome ore grains as herein defined) of the invention wherein the silica content is low (0.5 to 1.3%), the lime/silica ratio may be either high (1.8 to 2.5), in which case it is preferred that $Ca(NO_3)_2$ be employed as the binder (noting, however, that other calcium containing binders such as CaO, $Ca(OH)_2$ or $CaCO_3$, by way of examples, may be employed instead), or low (0.2 to 1.0), in which case the binders may preferably be $MgCl_2$, $MgSO_4$, or lignosulfonate, by way of examples, the use of $Ca(NO_3)_2$ being avoided. In that embodiment of the invention wherein the silica content is high (1.4 to 2.5%), the lime/silica ratio must be low (0.2 to 1.0) and the binders may again be preferably $MgCl_2$, $MgSO_4$ or lignosulfonate, by way of examples, the use of $Ca(NO_3)_2$ again be avoided.

DESCRIPTION OF THE PREFERRED EMBODIMENTS

The chemically bonded chrome-magnesia refractories having unusual hot strength properties and, in sharp contrast to the presently used fired or direct bonded product, exhibiting remarkable volume stability in the long time, high temperature applications, are achieved by a mix in which the refractory components are sized graded magnesia and chrome ore grain in a weight ratio between 90/10 and 30/70 and with a lime/silica ratio in the range of 0.2 to 2.5 depending on the total silica content (0.5 to 2.5% by weight on the basis of an oxide analysis of the whole mix) of the system. The major portion of chrome ore grains must be fine, i.e., of a size to pass 24 mesh screens and stay on 200 mesh screens.

One of the most significant and beneficial properties achieved by the new brick of this invention, having the formulations herein indicated, is its volume stability during service in a furnace. This is especially apparent in brick having those formulations wherein the lime/silica ratio is in the higher range such as 1.8 to 2.5. It has been observed that this brick, in sharp contrast to the presently used fired brick, exhibits permanent volume stability in the long time, high temperature applications.

Known prior art chemically bonded bricks experience permanent expansion when in service. In an open hearth furnace, for example, which is basically rectangular in shape, the end walls tend to expand which results in buckling.

The brick of the present invention, however, is unusually stable and does not expand, even after extended service. In fact, in some experimental furnace applications, the brick of this invention was found to have a minor shrinkage. Because of this vey unique property, application of the improved brick of this invention appears to be a major breakthrough in furnace applications such as, for example, the open hearth, the electric and perhaps even the AOD's.

Specifically, it has been found that a mix comprised as follows, on the basis of 100 parts, results in a chemically bonded chrome-magnesia refractory having the aforenoted unusual hot strength properties and exhibiting the remarkable volume stability desired in long time, high temperature applications: 50–70 parts 95% MgO periclase, 30–45 parts Transvaal chrome ore, 1 to 4 parts calcium nitrate solution, 0.3 part fumed silica addition, and 1.25 parts of ligno-sulfonate. Note that in this example calcium nitrate is present. Calcium nitrate, however, is not required in order to achieve the benefits of this invention although its presence is preferred.

More broadly, therefore, the chemically bonded chrome-magnesia refractories of this invention are achieved by a mix make-up and method comprised of preparing a batch of from 30 to 90 parts of size graded periclase and 70 to 10 parts of size graded particles of chrome ore, the major portion (preferably all) of the chrome ore grains passing 24 mesh screens and staying on 200 mesh screens; mixing the grains with sufficient amounts of liquid to temper the batch for efficient forming; forming the mixture into shapes; and drying at a temperature of around 120° C. (250° F.). The tempering liquid may be water. The tempering liquid, prior to the forming of a refractory shape, may contain dissolved chemical binders such as $MgCl_2$ and/or $MgSO_4$. Such binders may be added in the form of solid crystals. The tempering liquid may contain ligno-sulfonate. Such ligno-sulfonate binders may be in the amount of 0.5 to 1.5%, added in a solid form. And, as indicated above, the tempering liquid may contain calcium nitrate; where the tempering liquid is water the calcium nitrate may be added in a form of solid particles.

The silica content of the description of the broader form of the invention should be in the range of 0.5 to 2.5% by weight on the basis of an oxide analysis of the whole mixture. Again with respect to the broader form of the invention, the lime/ratio is in the range of 0.2 to 2.5. When the silica content is in the range of 0.5 to 1.3%, the lime/silica ratio may be either in the range of 1.8 to 2.5, in which case it is preferred that $Ca(NO_3)_2$ is employed, or 0.2 to 1.0, in which case the use of $Ca(NO_3)_2$ is avoided. When the silica content is in the range of 1.4 to 2.5%, the lime/silica ratio is also in the range of 0.2 to 1.0, the presence of $Ca(NO_3)_2$ again being avoided.

In those instances wherein the dicalcium silicate bonding is achieved in the practice of this invention, an achievement not found in previously used chemically bonded refractories, it may be that the formation of the $2CaO-SiO_2$ at a temperature so low (800° C.–1472° F.) is explained by the very high chemical reactivity of the added components, particularly the fumed silica and, in some instances, the calcium nitrate solution. In such cases other forms of active CaO can be used as long as the proper chemistry for the formation of dicalcium silicate is maintained.

Without wanting to be bound by theory, the fact that in the brick of this invention the direct bond is formed between chrome ore grains and the magnesia matrix by the temperatures reached during service, distinguishes this invention from present prior art chemically bonded magnesite-chrome brick. This may be due to increased surface contact resulting from the small chrome ore grains employed in the brick of this invention. The quite small chrome grains seem better able to completely bond to the magnesite grains. It is known that voids always exist in "green" chemically bonded brick between grains. The discovery which constitutes a part of this invention is that these voids can be eliminated at the hot face of the brick during service; this is apparently the result of direct bond formation between chrome ore grains and periclase matrix.

In the instant invention the metal elements, when employed, are oxidized as the shapes are used in actual practice. In view of the fact, however, that the shapes of the instant invention are not fired as a step in the preparation thereof, such metal elements may be placed in situ as the shapes are formed whereby a stronger, reinforced finished shape, a shape that is ready for use in an actual furnace and the like, is obtained.

CONCLUDING SUMMARY

From the foregoing, therefore, and considering the invention in its broader aspects, the invention resides in a chemically bonded refractory shape, and method for making same, comprised of refractory brick making size graded magnesia and chrome ore grain in weight ratio between 90/10 and 30/70, the major portion, and preferably all, of the chrome ore grains being of a size between −24 and +200 mesh screen. The silica content of the shape should be from 0.5 to 2.5% $SiO_2$ by weight on the basis of an oxide analysis of the whole mixture. The $CaO/SiO_2$ ratio is in the range of 0.2 to 2.5. Calcium nitrate may be employed, particularly in those formulations wherein the $SiO_2$ content is low (0.5 to 1.3%) and the $CaO/SiO_2$ ratio is high (1.8 to 2.5).

The method of making the chemically bonded refractory shape of this invention comprises the steps of preparing a batch from 30 to 90 parts of size graded periclase and of 70 to 10 parts of size graded particles of chrome ore, the major portion of the chrome ore grains being such as to pass 24 mesh screens and stay on 200 mesh screens; mixing the grains with sufficient amounts of liquid to temper the batch for efficient forming; forming the mixture into the desired shapes; and drying the shapes at a temperature of around 120° C. (250° F.). The tempering liquid, prior to the forming of the shapes, may contain dissolved chemical binders such as, for example, $MgCl_2$, $MgSO_4$, ligno-sulfonate, and/or calcium nitrate. Preferably the tempering liquid is water. In those embodiments of the invention wherein reinforcing metal elements are utilized, such elements may be placed in situ during the forming of the refractory mixture into the desired shapes.

In those instances wherein calcium nitrate is employed the calcium nitrate solution should contain at least 20% Ca $(NO_3)_2$. Other forms of active CaO, however, as for example $Ca(OH)_2$, $CaCO_3$ and the like may be used so long as the proper chemistry for the formulation of $2CaO-SiO_2$ is maintained. The formation of $2CaO-SiO_2$ at the low temperatures used in this process (800° C.–1472° F.) may be explained by the very high chemical reactivity of the fumed silica and the Ca(NO₃)₂ solution, and the relatively fine grains of chrome ore.

The chemically bonded magnesio-chrome refractories resulting from the foregoing formulations and methods possess unusual hot strength properties and exhibit remarkable volume stability such that the refractory shapes are suitable for use in severe high temperature environments on the order of 2800° F. to 3100° F. (1540° C. to 1705° C.). The shapes of this invention do not require a firing step; they are ready for use after having been dried at a temperature of around 120° C.,(250° F.).

Such shapes, therefore, are ready for use in what heretofore would have been termed their "green" condition. And some of these may have reinforcing metal elements incorporated therein.

EXAMPLE

| MATERIAL: | |
|---|---|
| Standard 96MgO[1] | |
| −8 + 16 Mesh | 35.0 |
| Ball Mill Fines[2] | 25.0 |
| Washed Transvaal Chrome | |
| −24 + 200 Mesh | 40.0 |
| Ligno-Sulfonate, ADDED | 1.25 |
| Silica Fumed, ADDED | 0.3 |
| Calcium Nitrate, ADDED[3] | 1.4 |
| Batch Wt., Lbs. | 130 |
| Mixing Time, Dry | 2 Min. |
| Wet | 10 Min. |
| Moisture, % | 1.6 |
| Pressure, psi (Double Press) | 12,000 |
| OFF PRESS: | |
| Bulk Density, g/cm³ | 3.39 |
| AFTER DRYING: | |
| Bulk Density, g/cm³ | 3.37 |
| Modulus of Rupture, psi -1 1/4" × 1 1/4" × 6"[4] | |
| Room Temperatures After 300° F. | 1370 |
| 1000° F. | 530 |
| 1200° F. | 470 |
| 1400° F. | 410 |
| 1700° F. | 370 |
| 2000° F. | 670 |
| 2200° F. | 1340+ |
| 2400° F. | 1350+ |
| 2600° F. | 545 |
| 2700° F. | 220 |
| Open Porosity, % - Kerosene | |
| Room Temperature After 300 F. | 6.8 |
| 1000° F. | 14.0 |
| 1200° F. | 14.0 |
| 1400° F. | 14.2 |
| 1700° F. | 14.8 |
| 2000° F. | 14.8 |
| 2200° F. | 16.4 |
| 2400° F. | 16.3 |
| 2600° F. | 16.5 |
| 2700° F. | 16.3 |

[1]3.5:1 C/S
[2]62% -325 Mesh
[3]Added in water Solution 1.45 Sp. Gr.
[4]Continuous H.M.O.R. - Run No. 1 (1000°-2000° F.) Heat 600/hr-hold
Run No. 2 (2200°-2700° F.) overnight - 30 Min. Holding/Temperature It is believed that the foregoing constitutes a full and complete description of the invention. There may be variations possible, however, which will appear to those skilled in the art, variations which however will fall within the scope and spirit of the invention as described herein. Although the invention has been described with respect to particular formulations and method steps, the invention is not limited precisely thereto except insofar as such formulations and steps are specifically set forth in the subjoined claims.

Having thus described the invention, what is claimed as new and what is desired to be protected by Letters Patent is:

1. A chemically bonded magnesia-chrome refractory especially suited for use, in the unfired state, in the construction of steel making furnaces wherein high operating temperatures such as in the range of 2800° F. to 3100° F. may be encountered, such refractory being comprised of refractory brickmaking size graded magnesia and chrome ore grain in a weight ratio between 90/10 and 30/70, the major portion of the chrome ore grains being of a size between 24 and +200 mesh screen; and a chemical binder; said refractory having a silica content of 0.5% to 2.5% by weight on the basis of an oxide analysis of the whole refractory mixture; and the refractory containing lime (CaO) in a lime/silica ratio (CaO/SiO₂) in the range of 0.2 to 2.5; said refractory being further characterized by a relationship between the said silica content and the said lime/silica ratio such that when the silica content is on the high side (1.4% to 2.5%), then the said lime/silica ratio must be on the low side (0.2 to 1.0), and when the said silica content is on the low side (0.5% to 1.3%), then the lime/silica ratio may be 0.2 to 2.5; and said refractory being further characterized by a relationship among the silica content, lime/silica ratio and chemical binder such that when the silica content is on the high side (1.4% to 2.5%) and therefore the lime/silica ratio is on the low side (0.2 to 1.0), then the chemical binder should be free of calcium; and such that when the silica content is on the low side (0.5% to 1.3%) and the lime/silica ratio is also on the low side (0.2 to 1.0), then the chemical binder should again be free of calcium; but such that when the silica content is again on the low side (0.5% to 1.3%) but with the lime/silica ratio being on the high side (1.8 to 2.5), then the chemical binder may contain calcium; said refractory having, in its unfired state, improved strength, slag resistance and volume stability in long time, high temperature applications such as in the construction of steel making furnaces.

2. The method of making a chemically bonded magnesia-chrome refractory shape especially suited for use, in the unfired state, in the construction of steel making furnaces wherein high operating temeratures such as in the range of 2800° F. to 3100° F. may be encountered, which method comprises the steps of:

(a) preparing a batch of refractory brickmaking size graded magnesia and chrome ore grain in a weight ratio of 90/10 and 30/70, at least a major portion of the chrome ore passing 24 mesh screens and retaining on 200 mesh screens, said batch including lime and silica, the silica content being 0.5% to 2.5% by weight on the basis of an oxide analysis of the whole batch, and the lime/silica ratio being from 0.2 to 2.5;

(b) tempering the batch with a liquid sufficient to permit the formation of a shape, said liquid having a chemical binder dissolved therein;

(c) adjusting the batch so that when the said silica content is on the high side (1.4% to 2.5%) the lime/silica ratio will be on the low side (0.2 to 1.0), and so that when the said silica content is on the low side (0.5% to 1.3%) the said lime/silica ratio will be 0.2 to 2.5;

(d) further adjusting the silica content, lime/silica ratio and chemical binder in the batch so that when the silica content is on the high side (1.4% to 2.5%) and therefore the lime/silica ratio is on the low side (0.2 to 1.0), then the chemical binder should be free of calcium; and such that when the silica content is on the low side (0.5% to 1.3%), and the lime/silica ratio is also on the low side (0.2 to 1.0), then the chemical binder shoulder again be free of calcium; but such that when the silica content is again on the low side (0.5% to 1.3%) but with the lime/silica ratio being on the high side (1.8 to 2.5), then the chemical binder may contain calcium;

(e) forming a shape from the tempered batch; and (f) drying the shape; whereby to achieve a refractory shape having, in its unfired state, improved volume stability in long time, high temperature applications such as in the construction of steel making furnaces.

3. The method of claim 2 in which the liquid is water.

4. The method of claim 2 in which the lime/silica ratio in the batch is kept within the range of 1.8 to 2.5, and the chemical binder being selected from a class consisting of $MgCl_2$, $MgSO_4$, ligno-sulfonate, and calcium nitrate.

5. The method of claim 4 in which the liquid is water.

6. The method of claim 2 in which the liquid is water and in which the chemical binder is ligno-sulfonate in the amount of 0.5% to 1.5%, added in a solid form.

7. The method of claim 2 in which the $CaO/SiO_2$ ratio in the batch is kept within the range of 1.8 to 2.0 and the chemical binder is restricted to a group consisting of $Ca(NO_3)_2$ and ligno-sulfonate.

8. The method of claim 2 in which the $CaO/SiO_2$ ratio is kept below 1.0, and the chemical binder is restricted to a group consisting of $MgCl_2$, $MgSO_4$ and ligno-sulfonate.

9. A refractory shape having the composition of claim 1 and including a reinforcing metal element incorporated therewith.

10. A refractory shape having the composition of claim 1 and in which the said magnesia comprises 50 to 70 parts of size graded periclase, and the said chrome ore grains comprises 30 to 45 parts of size graded particles of Transvaal chrome ore.

11. A refractory shape having the composition of claim 1 and including 0.1% fumed silica addition.

12. A refractory shape having the composition of claim 1 and including 0.5 to 1.5 parts ligno-sulfonate.

13. A refractory shape having the composition of claim 1 and including CaO in an amount that the $CaO/SiO_2$ ratio is 1.8 to 2.0.

14. A refractory shape having the composition of claim 1 and in which the said size graded magnesia is present as 60 parts of a mixture comprised of 96% MgO, 3.5% CaO and 1% $SiO_2$, 35 of said parts being $-8+16$ mesh and 25 of said parts being ball mill fines such that 62% is $-325$ mesh.

15. A refractory shape having the composition of claim 1 and in which the said chrome ore grains are present as 40 parts of washed Transvaal chrome ore of $-24+200$ mesh.

16. The method of claim 2 including the step of incorporating a metal reinforcing element with the said shape which is formed from the tempered batch.

17. A refractory shape having the composition of claim 1 in which all of the chrome ore grains pass a 24 mesh screen size.

18. The method of claim 2 in which all of the chrome ore grain passes a 24 mesh screen size.

19. A refractory shape according to claim 1 in which the silica content is 0.5% to 1.3% and the lime/silica ratio is 1.8 to 2.5.

20. The refractory shape of claim 19 including calcium nitrate as the chemical binder.

21. The refractory shape of claim 19 in which the chemical binder is selected from a class consisting of $Ca(NO_3)_2$, $Ca(OH)_2$, CaO and $CaCO_3$.

22. The refractory of claim 1 in which the chemical binder is selected from a class consisting of $MgCl_2$, $MgSO_4$ and ligno-sulfonate.

23. A refractory shape having the composition of claim 1 in which the lime is included such that the lime/silica ratio is 1.8 to 2.5, and including 3 to 4 parts of a calcium nitrate solution containing at least 20% $Ca(NO_3)_2$.

24. A refractory shape having the composition of claim 1 and including lime in an amount such that the lime/silica ratio is 1.8 to 2.5, and including 1.4 parts calcium nitrate added.

* * * * *